United States Patent [19]
Schubart et al.

[11] Patent Number: 5,889,123
[45] Date of Patent: Mar. 30, 1999

[54] POLYMER COMPOUNDS AND THEIR USE FOR THE VULCANIZATION OF HALOGENATED BUTYL RUBBERS WITH A LOW HALOGEN CONTENT

[75] Inventors: Rüdiger Schubart; Rüdiger Musch, both of Bergisch Gladbach; Anthony Sumner, Köln; Stefan Kelbch, Much, all of Germany

[73] Assignee: Bayer Aktiengesellschaft, Germany

[21] Appl. No.: 939,423

[22] Filed: Sep. 29, 1997

[30] Foreign Application Priority Data

Oct. 7, 1996 [DE] Germany ............... 196 41 154.8

[51] Int. Cl.⁶ .................................................. C08F 14/00
[52] U.S. Cl. ..................... 525/330.7; 525/330.9; 525/331.1; 525/331.7; 525/331.8; 156/110.1
[58] Field of Search ................ 525/330.7, 330.9, 525/331.1, 331.7, 331.8; 156/110.1

[56] References Cited

FOREIGN PATENT DOCUMENTS

| | | |
|---|---|---|
| 0 385 760 | 9/1990 | European Pat. Off. . |
| 0 763 561 | 3/1997 | European Pat. Off. . |
| 0 806 449 A1 | 11/1997 | European Pat. Off. . |
| 2 072 576 | 10/1991 | United Kingdom . |

OTHER PUBLICATIONS

Database WPI, Section Ch, Week 9613, Derwent Publications Ltd., London, GB; & JP 08 020 693 (A Exxon CHM Patents Inc) Jan. 23, 1996.

*Primary Examiner*—Duc Truong
*Attorney, Agent, or Firm*—Connolly & Hutz

[57] ABSTRACT

Compositions comprising new halogenated butyl rubbers with a defined, low content of halogen, a defined content of non-halogenated double bonds and a defined content of anti-agglomeration/vulcanisation control agents and containing polymer compounds comprising special amidines, mercapto or zinc mercapto compounds and polymers possess outstanding mechanical and physiological properties, so that they are suitable for the production of tyres, particularly tyre inner liners, tyre sidewalls and tyre treads.

2 Claims, No Drawings

POLYMER COMPOUNDS AND THEIR USE FOR THE VULCANIZATION OF HALOGENATED BUTYL RUBBERS WITH A LOW HALOGEN CONTENT

This invention relates to the production of compositions comprising polymer compounds of amidines, mercapto compounds and polymers, and new butyl rubbers containing halogens, and to their use for the production of vulcanised rubber materials.

The use of halogenated butyl rubbers is known for the construction of tires in particular, since halogenated butyl rubbers have proved to be particularly advantageous as regards adhesion behaviour, flexural strength and service life, and as regards impermeability to air and water. Due to the balance between the said physical properties, halogenated butyl rubbers are preferably used in the construction of tires and are used in particular there for the production of tire inner liners. Due to the use of tire inner liners based on halogenated butyl rubbers, the tire carcass and the steel or textile cords used therein are protected from attack by moisture and atmospheric oxygen. This has a positive effect on the service life of pneumatic tires, particularly heavily loaded truck tires.

There has been no lack of attempts aimed at improving the physical properties of halogenated butyl rubbers, for example by increasing the halogen content in the butyl rubber (improvement of the adhesion properties). Reference is made in this connection to U.S. Pat. No. 2,698,041, to British Patent Application GB 2 072 576, and to European Patent Application EP 0 385 760, where halogenated butyl rubbers and their application to and use in tire construction are described.

On account of the disadvantages of using pure halogenated butyl rubbers as the rubber material for inner liners (see EP 0 385 760), the use of mixtures of halogenated butyl rubbers and pure butyl rubber has recently been proposed. This is claimed to reduce the formation of tears in the inner liners caused by thermal hardening processes, and ultimately has a positive effect on the life of a pneumatic tire.

Disadvantages of the halogenated butyl rubbers or compositions comprising halogenated butyl rubbers with pure butyl rubber which are described in the prior art comprise, for example, their unsatisfactory ageing behaviour, the formation of corrosive hydrogen halide during the crosslinking process, and the low rates of crosslinking of the blends described, which result in the impairment of productivity in tire manufacture.

The object of the present invention is therefore to provide halogenated butyl rubbers for which an improvement in the aforementioned properties as a whole is ensured by the addition of defined polymer compounds, without the use of blends of halogenated butyl rubbers and non-halogenated butyl rubbers being necessary.

This object is achieved in that the rubber compounds contain new halogenated butyl rubbers with a defined low content of halogen, a defined content of non-halogenated double bonds and a defined content of anti-agglomeration/vulcanisation control agents and polymer-bonded blends of amidines and defined mercapto compounds.

The present invention accordingly relates to compositions of halogenated butyl rubbers (A) with a halogen content of 0.5 to 2.5%, a content of non-halogenated double bonds of more than 0.7 mole %, and a content of anti-agglomeration/vulcanisation control agents of 1.0 to 2.2% by weight, with respect to the total amount of halogenated butyl rubber, and of polymer compounds (B) consisting of a) cyclic and/or acyclic amidines,
b) mercapto compounds or zinc salts of mercapto compounds of benzothiazole, benzoimidazole, benzopyrimidine and/or benzotriazine, and
c) ethylene/propylene rubbers (EP(D)M), ethylene/vinyl acetate rubbers (EVM), butadiene rubbers (BR), stirene-butadiene rubbers (SBR), natural rubbers (NR), butadiene acrylonitrile rubber (NBR) and/or butyl rubbers (IIR), wherein in compound (B), components a) and b) are present in a molar ratio of 0.25:1 to 2.1 (a:b), the content of polymer binder c) is 90 to 10% by weight with respect to the total weight of components a) to c), and wherein component (B) polymer compound) is used in an amount of 0.1 to 20 parts by weight, preferably 0.5 to 10 parts by weight, with respect to 100 parts by weight of component (A).

According to the invention, butyl rubbers are understood to be those butyl rubbers which are halogenated by chlorine and/or bromine, preferably by bromine.

Bromobutyl rubbers with a content of non-brominated double bonds of 0.7 to 1.0 mole %, particularly 0.75 to 0.95 mole %, and a content of anti-agglomeration/vulcanisation control agents of 1.25 to 2.0% by weight, particularly 1.45 to 2.0% by weight, are preferred according to the invention.

The halogen content of the butyl rubbers according to the invention is preferably 0.8 to 1.9%. In the case of bromobutyl rubber the bromine content is preferably 1.4 to 1.8%.

"Butyl rubbers" according to the invention are understood to be copolymers based on isoolefines and olefines, such as those which are described in the aforementioned U.S. Pat. No. 2,698,041 and in the other cited patent publications, for example. The butyl rubbers are characterised in particular by a content of about 70 to 99.5% by weight of isoolefines containing 4 to 8 carbon atoms, such as isobutylene, 3-methylbutene-1,4, methylpentene-1,2, ethylbutene-1 and/or 4-ethylpentene-1, particularly isobutene, and by a content of about 0.5 to 30% by weight of dienes containing 4 to 18 carbon atoms, such as isoprene, butadiene-1,3, 2,4-dimethylbutadiene-1,3, piperiline, 3-methylpentadiene-1,3, hexadiene-2,4, 2-neopentyl-butadiene-1,3, 2-methylhexadiene-1,5, 2-methylpentadiene-1,4, 2-methylheptadiene-1,6, cyclopentadiene, cyclohexadiene, 1-vinylcyclohexadiene and mixtures thereof The use of isoprene is preferred. In addition, other monomers can be used in the customary amounts, such as stirene, chlorostirene and/or a-methylstirene.

Butyl rubbers with a content of isoolefines of 95 to 99.5% by weight and a content of dienes of 0.5 to 5.0% by weight are preferred. In this respect, the use of butyl rubbers based on isobutene and isoprene is particularly preferred.

The halogenated butyl rubbers according to the invention are characterised by a defined content of non-halogenated double bonds, a defined content of anti-agglomeration/ vulcanisation control agents and a defined content of halogens. It is therefore important that the procedure for the production of the butyl rubber from the aforementioned monomers is such that the disclosed contents are obtained. Butyl rubber can be produced in the usual manner by polymerisation in solution, in the gas phase or by the slurry method. Polymerisation is preferably conducted in suspension (slurry method) (see the Bayer Handbook for the Rubber Industry, Section A 9.1, page 208 (1991), for example).

The following are particularly suitable as anti-agglomeration/vulcanisation control agents: salts of fatty acids based on fatty acids containing 8 to 22 carbon atoms, preferably 12 to 18 carbon atoms, such as calcium, magnesium, potassium and/or ammonium stearates and palmitates and oleates. Other suitable anti-agglomeration/vulcanisation control agents include silicates such as calcium silicate. The anti-agglomeration/vulcanisation control agents can be used singly or in admixture with each other. The most favourable mixture ratio can easily be determined by appropriate preliminary tests. Calcium stearate and/or calcium palmitate are preferably used.

During the production of the butyl rubbers which are used as starting materials for the halogenated butyl rubbers according to the invention, it should be ensured that the anti-agglomeration/vulcanisation control agents are used in amounts which correspond to the quantitative ranges given above.

The halogenated butyl rubbers according to the invention can be produced either by treating finely divided butyl rubber with halogenating agents such as chlorine or bromine, preferably bromine, or, for the production of bromobutyl rubbers, by intensively mixing brominating agents, such as N-bromosuccinimide, with the basic butyl rubber in a mixing apparatus, or by treating a solution or dispersion of the basic butyl rubber with corresponding brominating agents in suitable organic solvents (see the Bayer Handbook for the Rubber Industry, Section A 9.1, page 208 (1991), for example).

In this respect, the halogenation of the basic butyl rubbers is controlled so that a residual content of non-halogenated or non-brominated double bonds remains, within the ranges defined above. The content of halogens, preferably bromine, thus falls within the ranges given above.

In polymer compound (B) according to the invention, components a) and b) are preferably present in a molar ratio of 0.5:1 to 1.5:1, and the content of polymer binder c) is preferably 30 to 60% by weight with respect to the total weight of components a) to c).

Amidines according to DE-A- 3 942 463 can be used as cyclic or acyclic amidines for the polymer compounds according to the invention, wherein compounds of general formulae III and IV which are described there are preferred. The use of 1,8-diazabicyclo-(5.4.0)-undecene (7) or 1,5-diazabicyclo-(4.3.0)nonene-(5) (DBN) is preferred. The amidines may also of course be added in solid form as adsorbates on organic or inorganic supports, e.g. kaolin, chalk, or activated carbon.

Suitable mercapto compounds include mercapto compounds and zinc salts of mercapto compounds of benzothiazole, benzoimidazole, benzopyrimidine and/or benzotriazine. Mercapto compounds and zinc mercapto compounds of benzothiazole, benzoimidazole and 4,5-methylbenzoimidazole are preferably used, wherein mercaptobenzoimidazole, zinc mercaptobenzoimidazole and 4-methyl- or 5-methyl-mercaptobenzoimidazole, and 4-methyl or 5-methyl-zinc mercaptobenzoimidazole are particularly preferred.

EP(D)M and EVM are particularly suitable as polymer components c).

Components a) to c) can each be used either individually or in any mixtures with each other. If mixtures of amidines a), mercapto compounds b) or polymers c) with each other are used, the most favourable mixture ratio in each case can easily be determined by appropriate preliminary tests. This also depends on the desired property spectrum of the vulcanised materials to be produced.

The polymer compounds according to the invention can be produced in the usual manner by mixing components a) to c) in customary mixer units, such as internal mixers, extruders or rollers, wherein other rubber adjuvant substances or additive materials, such as carbon black, chalk, kaolin, hydrated silica, plasticisers, colorants, biocides and/or vulcanisation accelerators can be admixed with components a) to c). After mixing components a) to c) in the usual mixer units, the polymer compounds are subsequently converted into the corresponding customary forms for use, such as granular material.

The halogenated butyl rubber vulcanised materials are primarily used in the production of tires, particularly for the production of tire inner liners and tire sidewalls, and are also used for tire treads. In addition, the halogenated butyl rubber vulcanised materials are used in pharmaceutical applications such as flexible tubing and stoppers. It is also possible to mix the halogenated butyl rubbers in the usual amounts with all known synthetic rubbers and natural rubbers and with customary fillers such as carbon blacks or hydrated silicas.

The compositions comprising halogenated butyl rubbers (A) and polymer compounds (B) which are produced according to the invention have the following advantages compared with the compositions which have been known hitherto and which are based on halogenated butyl rubbers or a mixture thereof with pure butyl rubbers: constant adhesion of the tire liner to the carcass, attainment of a higher rate of crosslinking, more rapid attainment of the optimum for the degree of crosslinking without unwanted, slow subsequent crosslinking, reduced growth of tears during the use of inner liners, and in particular, a considerably improved resistance to ageing, and, associated therewith, a longer service life of the inner liner and of the tire.

According to the invention, the polymer compounds are mixed with the halogenated butyl rubbers in customary mixer units with before vulcanisation. The preferred mixer units are the internal mixers, rolls, or mixer-extruders which are customary in the rubber industry, which generally operate with shear rates of 1 to 1000 $sec^{-1}$, preferably 1 to 200 $sec^{-1}$.

Vulcanisation can be effected at temperatures of 20° to 250° C., preferably 140° to 210° C., optionally under a pressure of 10 to 200 bar.

EXAMPLES

Examples of the production of polymer compound (B) according to the invention

TABLE 1

| Substances used | Material employed[1] |
| --- | --- |
| 1,8-diaza-bicyclo (5.4.0)-undecene (7) | DBU |
| 4/5-methylmercaptobenzoimidazole (mixture) | Vulkanox MB 2 |
| EPDM polymer | AP 147 |
| EVM polymer | Levapren 452 K |

[1]Products sold by and commercial products of Bayer and its subsidiary companies Production of the polymer compound The 4 components were continuously added, at temperatures of up to 100° C., to a twin-shaft endless screw device, Type ZSK 32, fitted with a die outlet, and were mixed at 60 rpm and discharged as a continuous length via the die. The product length was cooled with nitrogen, granulated and given a light coating of french chalk.

The 4 components were introduced in the following ratios:

| Polymer | Amount g | Mercapto compound | Amount in g/mole | Amidine | Amount in g/mole |
| --- | --- | --- | --- | --- | --- |
| AP 147 | 50 | Vulkanox MB2 | 75/0.45 | DBU | 50/0.32 |
| Levapren 452 K | 50 | | | | |

Examples of the production of halobutyl rubber (A)

bromobutyl rubber

A commercially available butyl rubber supplied by Bayer-Rubber N.V., Antwerp, Belgium, with the trade name Polysar Butyl® 301, was used for the production of halogenated butyl rubbers according to the invention. This butyl rubber had the following composition and physical properties:

isoprene content: 1.55 to 1.95 mole %, isobutylene content: 97.5 to 98.0,

Mooney viscosity $M_L$ at 125° C.: 51±5.

This butyl rubber starting material was brorminated in the following manner:

A solution of 15 to 20% by weight of the aforementioned butyl rubber in hexane was first prepared. 36 kg bromine per 1000 kg butyl rubber used were added under carefully controlled conditions to the butyl rubber polymer solution. Bromination was conducted at 50° C. with intensive mixing of the polymer solution in hexane. After the reaction was complete, the product was neutralised with 50% by weight sodium hydroxide solution and 21 kg of calcium stearate per 1000 kg butyl rubber used were added to this mixture, together with 13.5 kg of epoxidised soya oil per 1000 kg as a stabiliser. The solvent was subsequently evaporated in the usual manner. A rubber suspension remained behind, from which the solid rubber was obtained in the usual manner. The bromobutyl rubber obtained had a bromine content of 1.37%, a content of non-halogenated double bonds of 0.93 mole %, and a content of fatty acid salt of 1.45% by weight, with respect to the total amount of butyl rubber used (bromobutyl rubber: BIIR 1).

Comparative samples 2 and 3 (bromobutyl rubbers BIIR 2 and 3, respectively) were produced in the same manner—as described above. BIIR 3 was a comparative sample and had the properties of the Polysar Brombutyl 2030® standard, with a halogen content and a content of fatty acid salt which were higher than those of the rubber according to the invention. Compounds were formulated using the bromobutyl rubbers given in Table 1 (Tables 3 and 4). The compound components listed in Table 3 were carbon black (Corax N660, obtainable from Degussa), mineral oil (Sunpar 2280, obtainable from Sun Oil), resin (Pentalyn A, obtainable from Herkules), stearic acid (obtainable from Henkel), and MBTS (Vulkacit DM/MG, obtainable from Bayer).

These compound components were mixed in a Werner & Pfleiderer GK 1.5 E internal mixer. Thereafter, zinc oxide and sulphur were added on a roll. After mixing on the roll was complete, test specimens were produced. The vulcanisation behaviour (scorch time $t_{90}$, maximum torque) was measured using an MDR 2000 Rheometer (supplied by Flexsys). Amongst other properties, the mechanical properties and the dynamic tear resistance were determined as vulcanisation properties.

The dynamic tear resistance was measured with the Bayer Tear Analyser, which is described by U. Eisele, S. A. Kelbch and H. W. Engels in Kautsch., Gummi, Kunstst. 45, 1064 (1992). This machine enables the loading and environmental conditions of components of tire rubbers during the operation of the tire to be simulated. For a series of different tire components, including inner liner compounds, it has been shown that it is possible to obtain good correlations between the results of this special laboratory test and the results of tire tests (see A. J. M. Sumner, S. A. Kelbch and U. G. Eisele, Proceedings of the 146th ACS Rubber Meeting, October 1994, Pittsburgh, Paper 18). Rubber strips (60×15× 1.5 mm) with a lateral incision (about 1 mm deep) are employed as test specimens. A test is performed under controlled conditions which correspond to those in the tire.

A servo-hydraulic drive moves a reciprocating piston comprising the lower specimen holders. Within the range of capacity of the servo-hydraulics, any time-dependent alternation of load can be employed. A pulse-like type of loading is employed for tire compounds. Each (black) specimen (a maximum of 10 simultaneously), which is illuminated from behind, is attached to a load cell, which in turn is fixed to a stepper motor. On the one hand, the time-dependent stress in the material is measured by the load cell, and on the other hand the minimum force (prestress) is controlled via the stepper motors. In addition to the minimum and maximum stresses and the elongation, the stored energy densities and the permanent elongation of the specimens are also measured. The tear pattern is recorded by a CCD video shutter camera, which is fixed to an x/y carriage driven by a stepper motor. This is then transferred to an image recording card, digitised, and the tear contour length is determined via software, after locating the tear lips and the tear base by surveying the black area/line of the tear. The tear propagation rate $dlnc/dn = 1/c(dc/dn)$ is determined from the dependence of the tear contour length on the number of load alternations, and is used for the range of measured data before catastrophic tear growth.

It has been shown by correlation with tire tests (see A. J. M. Sumner, S. A. Kelbch and U. G. Eisele, Rubber World 213, No. 2, 38 (1995)) that inner liner compounds are subjected to a constant tensile loading, so that a comparison of tear propagation rates has to be made at constant elongation.

The tear resistance of the compounds investigated was measured for un-aged and for aged (168 hours at 120° C., circulating air oven) specimens.

The results from Table 3 show the following:

The addition of the polymer compound in Examples 2, 4, 6 and 8 results in more rapid full vulcanisation and a higher network density in each case compared with compounds 1, 3, 5 and 7, which were free from polymer compound. The vulcanisation behaviour can be adjusted by appropriate compounding, as shown by a comparison of batches Nos. 1 and 8, for example.

Table 4 shows how vulcanised materials can be produced by the combination of new bromobutyl rubber and polymer compound, and that the resistance to ageing thereof when stored in hot air is considerably better (Example 12) than that of corresponding formulations which contain no polymer compound or which are synthesised based on the standard polymer (Examples 9–11). It is precisely the unwanted increase in modulus after ageing which has a negative effect on the tear resistance of inner liner compounds (Examples 9–11).

Bromobutyl rubbers 1 and 2 are particularly recommended for use in inner liner compounds of long-life truck tires with an appropriate balance of critical properties.

TABLE 2

Bromobutyl rubbers used

| BIIR | Bromine content (%) | Content of non-brominated double bonds (%) | Content of fatty acid salts (%) | Content of calcium salts (%) | Content of sodium salts (%) | Stabilisers (%) |
|---|---|---|---|---|---|---|
| 1 | 1.4 | 0.93 | 1.42 | <0.02 | <0.02 | 1.10 |
| 2 | 1.76 | 0.77 | 2.1 | <0.02 | <0.02 | 1.35 |
| 3 x) | 1.94 | 0.65 | 2.45 | <0.02 | <0.02 | 1.50 | x) Comparative test; Polysar Brombutyl 2030 (Bayer)

TABLE 3

Stability of compounds on storage, and vulcanisation

| No. | | 1 *) | 2 *) | 3 *) | 4 | 5 *) | 6 | 7 *) | 8 |
|---|---|---|---|---|---|---|---|---|---|
| Formulation | | | | | | | | | |
| BIIR 3 | | 100 | 100 | — | — | — | — | — | — |
| BIIR 1 | | — | — | 100 | 100 | 100 | 100 | 100 | 100 |
| Carbon black N 660 | | 60 | 60 | 60 | 60 | 60 | 60 | 60 | 60 |
| Polymer compound | | — | 2.25 | — | 2.25 | — | 2.25 | — | 2.25 |
| Sunpar 2280 | | 7 | 7 | 7 | 7 | 7 | 7 | 7 | 7 |
| Pentalyn A | | 4 | 4 | 4 | 4 | 4 | 4 | 4 | 4 |
| Stearic acid | | 1 | 1 | 1 | 1 | 1 | 1 | 1 | 1 |
| Vulkacit DM | | 1.3 | 1.3 | 1.3 | 1.3 | 1.3 | 1.3 | 1.3 | 1.3 |
| ZnO | | 3 | 3 | 3 | 3 | 1.5 | 1.5 | 3 | 3 |
| Sulphur MC | | 0.5 | 0.5 | 0.5 | 0.5 | 0.5 | 0.5 | 0.25 | 0.25 |
| Properties of compounds: Monsanto MDR 2000 (165° C., 30 minutes) | | | | | | | | | |
| ts01 | min | 1.84 | 1.26 | 2.15 | 1.52 | 2.2 | 1.54 | 2.43 | 1.71 |
| t90 | min | 5.9 | 6.03 | 8.45 | 7.19 | 7.85 | 7.28 | 5.59 | 7.55 |
| t95 | min | 8.86 | 7.07 | 14.45 | 8.79 | 13.0 | 8.84 | 6.86 | 8.99 |
| F max | Nm | 6.63 | 9.1 | 5.7 | 8.1 | 5.65 | 8.2 | 4.6 | 7.58 |

*) Comparative example

TABLE 4

Vulcanisation properties

| No. | | 9 *) | 10 *) | 11 *) | 12 |
|---|---|---|---|---|---|
| Formulation | | | | | |
| BIIR 3 | | 100 | 100 | — | — |
| BIIR 2 | | — | — | 100 | 100 |
| Carbon black N 660 | | 60 | 60 | 60 | 60 |
| Polymer compound | | — | 2.25 | — | 2.25 |
| Sunpar 2280 | | 7 | 7 | 7 | 7 |
| Pentalyn A | | 4 | 4 | 4 | 4 |
| Stearic acid | | 1 | 1 | 1 | 1 |
| Vulkacit DM | | 1.3 | 1.3 | 1.3 | 1.3 |
| ZnO | | 3 | 3 | 3 | 3 |
| Sulphur MC | | 0.5 | 0.5 | 0.5 | 0.5 |
| Properties of compounds: Monsanto MDR 2000 (165° C., 30 minutes) | | | | | |
| Strength | MPa | 10.4 | 12.9 | 10.7 | 11.2 |
| Ultimate elongation | % | 720 | 575 | 745 | 605 |
| 50% modulus | MPa | 0.82 | 0.84 | 0.82 | 0.83 |

TABLE 4-continued

Vulcanisation properties

| No. | | 9 *) | 10 *) | 11 *) | 12 |
|---|---|---|---|---|---|
| 100% modulus | MPa | 1.24 | 1.55 | 1.28 | 1.39 |
| Hardness (23° C.) | Shore A | 55 | 56 | 52 | 54 |
| Values after ageing for 7 days at 120° C. | | | | | |
| Strength | MPa | 9.2 | 10.9 | 9.2 | 10.1 |
| Ultimate elongation | % | 500 | 495 | 664 | 560 |
| 50% modulus | MPa | 1.37 | 1.15 | 1.14 | 1.02 |
| Hardness (23° C.) | Shore A | 62 | 60 | 59 | 57 |

TABLE 5

Dynamic crack growth resistance (Tear Anayser)
Crack growth rate, 1/c(dc/dn), Mc$^{-1}$ at 20% strain, T = 70° C.

| No. | | 9 *) | 10 *) | 11 *) | 12 |
|---|---|---|---|---|---|
| Unaged | % | 19 | 38 | 16 | 12 |
| Aged for 168 hours at 120° C. | % | 500 | 150 | 200 | 70 |

*) Comparative example

We claim:

1. Compositions comprising halogenated butyl rubbers and polymer compounds, characterised in that the halogenated butyl rubbers have a halogen content of 0.5 to 2.5% and have a residual content of non-halogenated double bonds of more than 0.7 mole %, and the content of anti-agglomeration/vulcanisation control agents is 1.0 to 2.2% by weight, with respect to the total amount of halogenated butyl rubber, and the polymer compounds consist of a) cyclic and/or acyclic amidines,
  b) mercapto compounds or zinc salts of mercapto compounds of benzothiazole, benzoimidazole, benzopyrimidine and/or benzotriazine, and
  c) ethylene/propylene rubbers (EPM), ethylene-propylene-diene rubbers (EPDM), ethylene/vinyl acetate rubbers (EVM), butadiene rubbers (BR), stirene-butadiene rubbers (SBR), natural rubbers (NR), butadiene acrylonitrile rubbers (NBR) and/or butyl rubbers (IIR),
  wherein components a) and b) are present in a molar ratio of 0.25:1 to 2.1 (a:b) and the content of polymer binder c) is 90 to 10% by weight with respect to the total weight of components a) to c), and wherein component (B) (polymer compound) is used in an amount of 0.1 to 20 parts by weight, with respect to 100 parts by weight of component (A).

2. Compositions as in claim 1 wherein component (B) (polymer compound) is used in an amount of 0.5 to 10 parts by weight with respect to 100 parts by weight of component (A).

* * * * *